United States Patent [19]
Skrivanek et al.

[11] Patent Number: 5,650,217
[45] Date of Patent: Jul. 22, 1997

[54] TACTILE IMAGE ENHANCER

[75] Inventors: David A. Skrivanek, Northvale; Joseph L. Zuckerman, Livingston, both of N.J.

[73] Assignee: Repro-Tronics, Inc., Westwood, N.J.

[21] Appl. No.: 544,733

[22] Filed: Oct. 18, 1995

Related U.S. Application Data

[63] Continuation-in-part of Ser. No. 213,252, Mar. 15, 1994, abandoned.

[51] Int. Cl.$^6$ ...................................................... B32B 3/00
[52] U.S. Cl. .......................... 428/195; 428/174; 428/206; 428/402; 428/411.1; 428/913; 442/74; 442/103
[58] Field of Search ...................... 156/86, 161; 428/195, 428/206, 240, 402, 174, 913, 411.1; 503/226

[56] References Cited

U.S. PATENT DOCUMENTS

| | | | |
|---|---|---|---|
| 5,125,996 | 6/1992 | Campbell et al. | 156/196 |
| 5,281,408 | 1/1994 | Unger | 424/9.4 |
| 5,325,781 | 7/1994 | Dupont et al. | 101/487 |

*Primary Examiner*—William Krynski
*Attorney, Agent, or Firm*—Notaro & Michalos P.C.

[57] ABSTRACT

A sheet material is capable of converting a two dimensional image which may be of interest to a visually handicapped individual, into a three dimensional raised image that can be perceived by the visually handicapped individual using the individual's tactile sense. The method, apparatus and material uses a sheet-like substrate which is coated throughout its entire area by an expandable composition. A two dimensional, initially flat, image can be drawn, imprinted or otherwise placed on the substrate using a dark, dense color which is preferably black. The black color of the image absorbs energy to a greater extent than the surrounding substrate so that when the substrate is irradiated, for example, using an infrared lamp in an enclosure through which the sheet of material passes, the image becomes puffed and raised. The visually handicapped individual can than touch the surface of the substrate and easily perceive the raised image. This opens an entire new class of images to the visually handicapped individual since using the invention, a wide variety of mechanisms can be used to place black images onto the substrate of the invention, and then the substrate is heated using the apparatus of the invention to raise the image and allow the handicapped individual to "view" in the tactile sense, art work, architecture, musical notes, maps, sketches, images and any other class of shapes which are normally perceivable only be a sighted individual.

7 Claims, 5 Drawing Sheets

TACTILE IMAGE ENHANCER

CROSS REFERENCE TO RELATED APPLICATION

This is a CIP of Ser. No. 08/213,252, filed Mar. 15, 1994 and now abandoned.

FIELD AND BACKGROUND OF THE INVENTION

The present invention relates in general to equipment and techniques for helping the visually impaired and blind, collectively referred to herein as visually handicapped individuals, and in particular to a new and useful method, apparatus and substrate which, together and separately, can be used to produce three dimensional images from initially flat images, which can thus be perceived by the visually handicapped individual, using the individual's sense of touch.

The use of touch by visually handicapped individuals is well established. For example there are currently four commonly used types of Braille text, which utilizes unique patterns of dots to designate numbers, letters, etc.

It is also known that visually handicapped individuals can perceive normal print, if it is raised and if it is generally of a size larger than 24 pt, and regular rather than bold print.

Various techniques are known for raising print on a page. These include mechanical techniques such as embossing, and the use of puffable inks and other similar techniques which are generally practiced using specialized and expensive equipment.

There is currently no mechanism, technique, equipment, substrate or apparatus, which is available that is sufficiently versatile, cheap and quick to utilize, and which would allow a visually handicapped individual to raise any image of his or her choice, including not only alphanumeric characters, but also any variety of symbols, drawings, paintings, sketches, maps, plans, layouts and any other visually perceptible two dimensional image.

SUMMARY OF THE INVENTION

An object of the present invention is to provide a technique, equipment and materials which allow for the creation of any two dimensional image, followed by the raising of that image so that it can be a tactile image, perceptible by a visually handicapped individual.

One important application of the invention is the generation of maps, plans, layouts, etc. so that a visually impaired or blind person can have one on their computer that shows the path of a fire exit in a building, for example. The layout could be the plan of the office space. The computer can generate a regular two dimensional image onto a specially coated substrate of the invention, which is then put into a puffing device of the invention and automatically the visually impaired person has a tactile readable map which he or she can follow.

This can be used for not only plans, but maps, pictures, or other drawings. This is in addition to puffing either Braille characters or conventional characters, which, for this application will be defined as having a minimum height of about 24 pt.

The purpose of the invention is to help all visually handicapped, both blind and visually impaired, which are legally two separate groups of people.

Another application of the invention is for art appreciation, where a famous painting is reduced by a hand tracing to its different shapes, elements, textures, etc., provided into each of these shapes and then this image can be puffed to provide the visually handicapped person with a tactile equivalent to the painting to help them appreciate the painting.

Another application is for ATM machines. There are six different common layouts for ATM machines. The visually handicapped person can be provided with six different layouts so they are prepared for all of them, with the instructions in Braille, so they can go into an ATM machine by themselves without help and with maximum security, since they do not have to give out their secret pin-number to use the machine. The technique can be expanded to calendars and games for learning. An application for children in particular is an ABC chart where the sighted child would normally repeat the letters of the alphabet several different times. The chart itself can be raised so that the visually handicapped child can feel where the letters should go, write the letters onto the page and then return the page to the machine for puffing the handwriting so that the child has immediate feedback on how well it did in reproducing the letters.

The invention can also be used for visually handicapped children for coloring. Visually impaired children enjoy coloring just as most children do. They have difficulty staying within the lines since the lines are hard or impossible for them to see. The image raising technique of the invention provides a physical border in each area which the visually impaired or blind child can feel as the child colors, allowing it to stay within the lines.

The invention can also be used on electronic circuit diagram, mechanical drawings, chemical structural diagrams, chemical and/or mathematical equations or formulae.

The combination of being able to raise any conventional types or printed page or computer generated page or handwriting, as long as the lines are dense and dark enough, makes the invention broadly applicable for many different classes of visually handicapped persons and also aesthetic value for people who can see if they want to accent their future or preexisting writings with raised images. For example, advertisements can be given a 3-D look using the invention.

A further object of the present invention is to provide a method for allowing a visually handicapped individual to appreciate any two dimensional image. A further object is to provide an apparatus comprising a machine and specially constructed substrate, which can be used together for raising any two dimensional image into a three dimensional image. A further object of the present invention is to provide a specially formulated substrate, advantageously in the form of a coated substrate, on which any energy absorbing image which can be used in conjunction with a suitable energy source (such as IR, RF, microwave, etc.) to generate heat and thereby raise the image. A substrate coated with the expandable coating of this invention may be coated on the back with a pressure sensitive or other type of adhesive so that it may be readily applied to other surfaces to create signs and the like. Also, the coating may be applied to many three dimensional and/or bulky, and/or difficult to move or manipulate objects, marked with a dark color (which absorbs infrared and converts it to heat) by use of any convenient marking instrument, and expanded with a handheld infrared source. Possible examples are plaques, walls, furniture, machines, appliances, etc.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
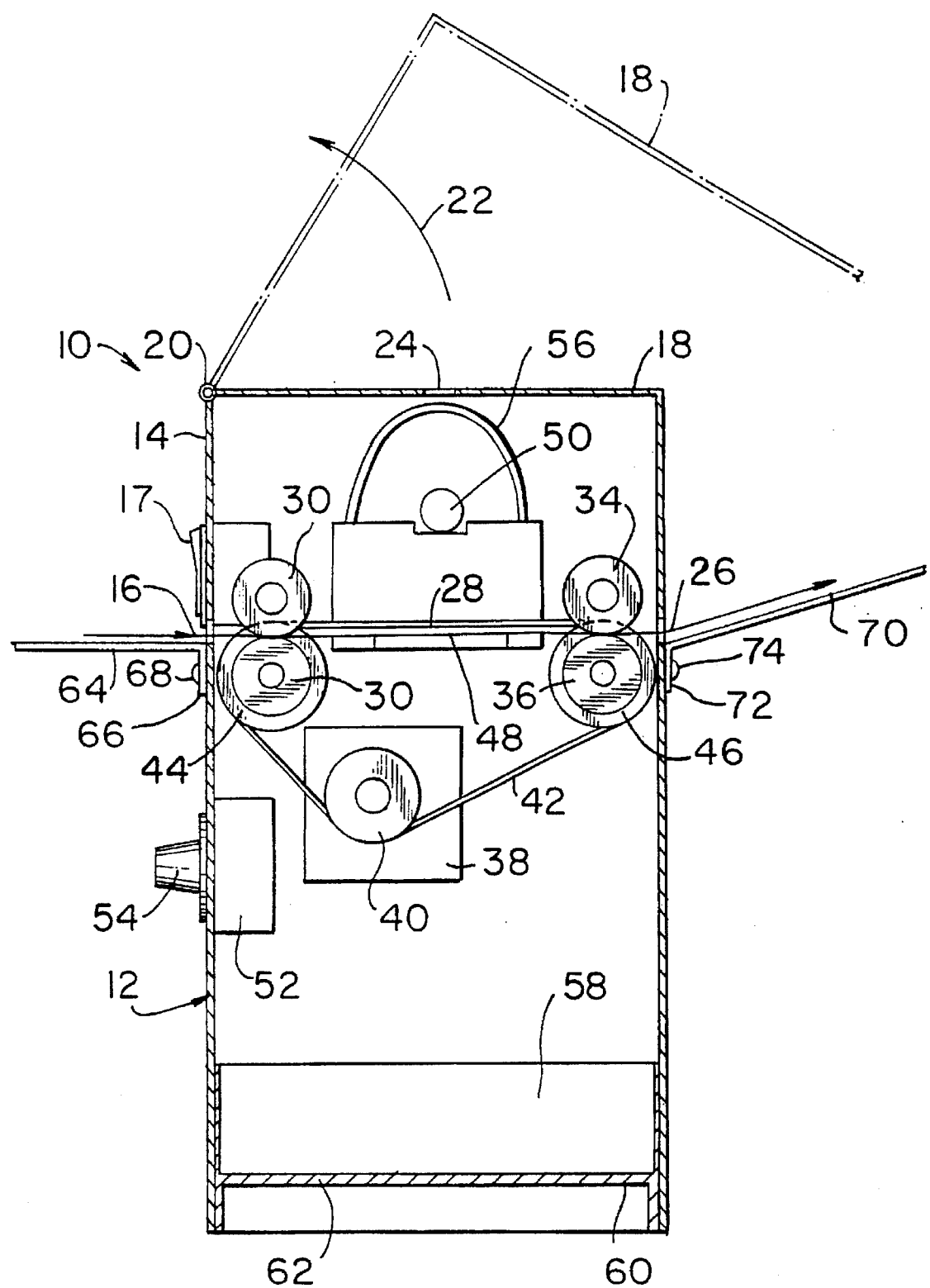
FIG. 1 is a simplified side sectional view of a machine constructed in accordance with the present invention.

Referring to the drawings in particular, the invention therein comprises a machine generally designated 10 in FIG. 1, which contains drive means and a source of infrared radiation for "developing" a substrate manufactured in accordance with the present invention, containing an initially two dimensional image, for raising the image into a three dimensional tactile image.

The purpose of the present invention is to create a raised image on a specially coated piece of paper or other appropriate substrate. This raised image can then be read by the blind or visually impaired, by using the sense of touch.

The method or technique of the present invention uses apparatus in the form of a machine shown at 10 in FIG. 1, and a substrate used in conjunction with the machine. A portable energy source can also be used with the substrate of the invention.

The Substrate

Many kinds of material may be used as a substrate for the invention. Depending upon the end use, stiff materials such as wood, fiberboard, plastic, metal, or other stiff or reinforced materials in the form of sheets or shapes may be used for labels, work surfaces, signs, furniture, walls, and so forth. Images may be put onto these materials in various ways, such as by drawing, painting, stamping, or writing. The images may be transferred or created directly, such as with carbon paper, or by other means. For very large, thick, stiff, or very soft or elastic materials, the expandable coatings may, if convenient, be applied by spray, brush, roller, etc. The coating may be air dried, and the heat used to expand the images maybe applied by a portable infrared or other suitable radiant energy source.

Films or sheets of soft or elastic materials such as elastomers or textiles (which may be used for packaging, clothing, etc.) and films of stiffer materials such as polyolefins, polyesters, polyamides, etc. (which may be used for decoration, packaging, machinery, appliances, signs, etc.) may be coated and processed using equipment appropriate to each substrate. Any substrate may be used for this process if it is coatable, resistant to the radiant energy used to raise the images, and can be made in such a way that its shape or texture does not interfere with tactile perception of the images raised thereon.

The substrate used in accordance with the present invention is coated with microbeads of a substance which, when subjected to infrared radiation or other radiant energy, expands. While microbeads are disclosed as the preferred expansion material, it should be understood that any other type of expandable coating can be utilized. For the purpose of the present application, the coating of the present invention will be referred to as the expandable composition. Paper and nonwoven fabrics are two examples of preferred substrates. Their advantages and disadvantages are discussed below.

Paper Substrate

Paper or paperboard may be used to make useful expandable sheets for the tactile image enhancer. Other substrates may also be chosen which have different valuable characteristics.

Among their advantages, paper and paperboard are inexpensive and are readily available in a wide variety of constructions suitable for this invention. In addition, coating equipment suitable for paper coating is commonly available and can be run at high speeds. Also, paper and paperboard are familiar bases for both printed and Brailled material. Equipment is commonly available for the printing, copying, binding, folding, gluing or otherwise manipulating of paper and paperboard.

Paper also has some disadvantages. When folded or creased, paper, and especially paperboard, retain creases which can be felt and can interfere with tactile interpretation of the enhanced images on the surface of the sheet. Also, when one side of the paper is coated with an aqueous coating, it absorbs water and swells, causing the paper to curl either during or after drying. This curl may interfere with processing, manufacturing, storage, handling, and performance of the product. Paper also tears easily, and wears readily. It is greatly weakened when wet so that it may abrade, tear, or become permanently adhered to an adjacent sheet. Paper may also be subject to weakening or destruction because of inherent acid content, oxidation, or consumption by microorganisms, insects, or other animals.

Nonwoven Substrates

We have found that there are both expected and unexpected advantages in using nonwoven fabrics (nonwovens) as substrates. The improved durability of synthetic fibers used in nonwovens, as compared to the less durable wood pulp fibers used to make paper is clear. Synthetic fibers used in nonwovens make them stronger and resistant to water, aging, and biological attack. They are not attractive as food for animals or insects. They do not absorb as much water as paper nor curl when coated on one side. Both of these properties enhance coatability. A portion of natural or semi-synthetic cellulosic fibers may be part of some nonwovens while still being superior to paper in the above properties.

The importance of being able to crumple and/or fold the sheets without leaving permanent creases became clear when tactily enhanced sheets made from certain types of nonwoven substrates according to the invention, were actually used by visually handicapped persons. Whereas a sighted person has little difficulty in refolding a map or other document along its original fold lines, the task is much more difficult for those who can not easily see the location and direction of the original folds. Sheets which can be crumpled up, without regard to the original fold lines, pocketed, and reopened for use without reducing the "readability" of the tactily enhanced images, are much more useful to the visually handicapped than are those which retain creases when crumpled.

To be usable with the present invention, a nonwoven must resist the temperatures used for drying the coatings, for copying the image onto the coated surface, and for expanding the image. The substrate must be smooth enough, or be capable of being made smooth enough by coating, calendaring, or other process, so that the texture of the substrate does not interfere with the tactile perception of the raised image.

In the preferred embodiment, the substrate should have a suitable stiffness to be used in typical photocopying machines and with the heating equipment used to enhance the image. Sheets which are too limp will not be grasped and moved properly by the mechanism, and may be folded or curled by the photocopier, or stick in the image enhancer and be overheated. Sheets which are too stiff, may also not be accepted by either machine or may become stuck, burnt, or cracked. Alternatively, if the substrate is not inherently stiff enough, the required degree of stiffness can be developed by means of a base coat and/or top coat application according to the invention. The required range of stiffness may easily be tested by passing the coated sheets through a photocopier. A preferred nonwoven substrate should also be resistant to permanent creasing when crumpled.

Types of Nonwovens Preferred

The fibers making up the nonwoven may be of any type currently used which can withstand the various temperatures encountered, as well as combinations thereof. Polyester and Polypropylene are preferred, especially polyester and blends of polyester with cellulosic fibers. Other fibers such as some polyolefins and polyamides may also be used. Synthetic or natural cellulosic fibers may be part or all of the compositions, as may reprocessed fibers. The weight of the nonwoven, paper, or other substrate is limited only by convenience. Weights of paper, paperboard, and nonwovens from 0.5 to 6 oz/sq.yd. have been used. Weights of nonwovens in the range of 1 to 2 oz/sq.yd., and especially about 1.5 oz/sq.yd. are preferred.

Below are examples of substrates made with nonwoven fabrics. Nonwoven type: Wet laid fiber saturated with an acrylic polymer latex type binder.

|  | Ex. 1 | Ex. 2 |
| --- | --- | --- |
| Fiber composition: | 100% Polyester | 80% Polyester 20% Cellulosic |
| Weight of Nonwoven (oz/sq. yd.) | 1.25 | 1.65 |
| Thickness of Nonwoven (inches) | 0.156 | 0.155 |
| Density (oz/sq. yd./inch of thickness) | 8 | 10.6 |
| First (base) coat used | Base Coat formula | Top coat formula |
| Base Coat (oz/sq. yd.) | 0.72 | 2.0 |
| Coated by: | Floating Knife | Knife over roll |
| Top coat (oz/sq. yd.) | 3.0 | 1.0 |
| Coated by: | Knife over roll | Knife over roll |

Both of the nonwoven fabrics disclosed above had good stiffness, good surfaces, ran well and made good dark images in a typical copying machine, made excellent raised images, and resisted creasing when crumpled. These two examples are not intended to limit the scope of this invention but are merely representative of acceptable substrate composition and properties.

The density of the nonwoven (oz/sq.yd./inch of thickness), and the smoothness, significantly affect the properties of the finished sheet. Nonwovens which are too dense are also usually too stiff and retain creases when crumpled. Those which are too low in density are usually too rough or too porous for direct coating. Some of these may be used in conjunction with a method of indirect coating; i.e., coating onto release paper and laminating the nonwoven into the coating. Indirect coating can be used with any substrate to enhance the usefulness of both low density and rough surfaced substrates. Frequently, low density nonwovens are also too soft or too limp for the photocopying and enhancing machinery to process them effectively. Appropriately chosen base coats or top coats or laminations may be used to adjust their stiffness.

Some nonwovens which are preferred are wet-laid, mainly polyester fiber, saturation bonded, and have thicknesses of 100 to 200 mil combined with weights of 1 to 3 oz/sq.yd., resulting in densities of 5 to 12 oz./sq.yd./inch of thickness. These are coated with 0.7 oz./sq.yd. dry of the base coat formula described below using a floating knife coater and then are coated by a knife over roll coater with 3.0 oz/sq.yd. dry of top coat, also described below. Alternatively, two coats of the top coat composition may be used. In this embodiment, the first coat ("base coat") of top coat composition at 2 oz/sq.yd. of dry coating following by a top coat of 1 oz/sq.yd. of top coat composition dry coating may be used. the base coat may be applied by knife over roll or by floating knife. The top coat is preferably applied by knife over roll.

The nonwoven fibers may be assembled by any means known to those skilled in the art which will yield the desired uniformity of surface and structure. Most commonly used processes for bonding the fibers may be used. These include, but are not limited to, hydroentangling, chemical bonding, wet bonding (printed or saturated), powder bonding, thermoplastic fibers, other binding fibers or spunbonding. The fiber bonds produced must resist the required temperatures and other processing conditions.

Cellulose Fibers in Nonwovens and in Paper

Paper is made from very short cellulose fibers (as compared to textile fibers) which are intermixed with water and then collected on a mould through which the water drains away, followed by a drying step. Although many natural plant sources have been used to make paper, the predominant source used today is wood fiber. The wood is macerated and disintegrated by mechanical and chemical means to form cellulose fibers, known as "wood pulp", about 0.01 to about 0.2 inches in length. Textile fibers are at least about ½ inch in length and may be as much as several inches in length.

Wood pulp, when suspended in water, collected, and dried, is able to bond with itself to produce a unitary sheet which we call paper. Wood pulp from reprocessed paper, new or reused macerated cellulose fibers, and various chemicals, may be added to the wet wood pulp mixture. The key to the nature of paper is the preponderance of short cellulose fibers which bond directly to each other as described above.

Cellulosic textile fibers used to make nonwovens are at least about ½ inch long. They may be natural cellulosic fibers such as cotton, flax (often called linen), bast (i.e., jute and hemp), ramie, etc. They may also be semi-synthetic fibers made by chemically converting natural cellulose (usually wood pulp) into a solution of modified cellulose which can be spun into fiber. Typical examples are Rayon (viscose or cupprammonium), cellulose acetate, and cellulose triacetate fibers. Many kinds of synthetic textile fibers may be used (as previously described) alone or in mixtures, to make nonwoven fabrics useful in this invention. Cellulose may be all or part of the fiber content. The cellulose may be in the form of wood pulp or of cellulose textile fibers.

Most nonwoven fabrics are held together either by mechanically entangling the fibers, by bonding with adhesives (which may optionally be in the form of fibers), or by chemically bonding adjacent fibers together. In the case of hydroentangled, or wet laid nonwovens, cellulose fibers in the form of wood pulp may be added to the mass of longer textile fibers, either for bonding, or to achieve other specific properties in the fabric. Wood pulp cellulose may be the principle bonding medium, or it may be auxiliary to other bonding methods, such as fiber entanglement, in a given fabric.

A nonwoven fabric may be distinguished from paper by two conditions. 1) The preponderance of fibers which are not wood pulp. They are textile fibers which are much longer than wood pulp fibers. 2) The use of bonding methods other than the direct aqueous bonding of wood pulp fibers to wood pulp fibers as all, or as a major part, of the bonding mechanism which holds the fabric together. This is non-paper cellulosic material.

Using The Substrate

The expandable composition is applied to the substrate while the composition is liquid and then the composition and substrate are heat dried at a temperature of less than about 175° F. (80° C.), producing the dry coated sheet material of the invention. A dark pattern, preferably carbon black or any other material which can be heated by radiant energy such as microwave, RF, or infrared, is then applied to the sheet material to form an image or shape. The image can be letters, numbers, maps, drawings, sketches or any other visually perceptible image. The image can be applied by any suitable means, for example, by photocopy machine, a laser printer, or even by writing on the surface using a permanent marker or other marking tool which can produce a sufficiently dense and thick area. If a microwave absorbing marking (such as one comprised of or containing a non-continuous or incomplete coating of metal or metal particles [of which aluminum is the preferred metal] then the energy source in the image enhancing machine will be a microwave source. If the marking contains an RF absorbent material such as a polymer with a large dipole moment such as PVC, or entrapped moisture, then the energy source in the image enhancing machine will be an RF source. When exposed to the machine of this invention, containing the appropriate energy source, the markings will convert the energy to heat and cause the expandable coating to expand thus raising the image to a 3 dimensional image.

When exposed to the source of radiant energy, the dark areas, by virtue of their increased absorption of radiant energy, heats to a greater extent than the surrounding substrate, resulting in a higher temperature and thus causing the expandable composition to expand. This "puffs" the image and converts the initially flat image on the flat substrate into a three-dimensional tactile image which can be felt, and thus appreciated, by the visually impaired.

One major advantage of the present invention is that the dry coated sheet material is sufficiently inexpensive, and the process for placing a dark image on the sheets sufficiently versatile and widespread, that virtually any image can be converted to a tactile image in the easiest, cheapest and quickest possible manner, using the present invention. This is distinguished from the use, for example, of puffable ink which requires special apparatus or modification to existing apparatus, to be applied to a substrate, or embossing or other techniques for producing three-dimensional effects.

These prior art techniques, require special equipment to apply the pattern onto a substrate and further equipment to dry or otherwise treat the pattern before it can be puffed, and still further equipment to puff the pattern.

Base Coat

Depending upon the choice of substrate and coating method chosen, a base coat may be desirable. The base coat may consist of the same coating as is used for the top coat. The base coat may be a variation of the top coat differing in concentration, expandable material content (if any), and/or rheology. Alternatively, the base coat may have a different polymer base than the top coat, differing in Tg, elongation, modulus, etc. The base coat, must however, be of such a composition that it will adhere to the substrate, and such that the top coat will adhere to the base coat.

Functions of the Base Coat

The functions of the base coat may be any or all of the following:

1. To seal the substrate surface so as to minimize and control the penetration of the top coat into the substrate. This can help to control the stiffness of the finished product and the amount of top coat required.

2. To increase the smoothness of the substrate surface. This can influence the smoothness of the finished coated surface of the product.

3. To adjust and optimize the stiffness of the finished sheet for (a) acceptance by a copying machine and by machinery used to expand the images; and (b) to retain or enhance the ability of the sheet with its raised image to be crumpled without leaving permanent creases which detract from its tactile effectiveness. For this purpose, the polymers and other ingredients of the coating composition should be chosen so that they are not too stiff and so that the base coat does not crack or retain wrinkles when folded or creased.

4. To prevent the expandable coating from expanding through the back (uncoated) side of the sheet and thus reducing the tactile effectiveness of the expanded image.

5. To reduce the processing time and cost by increasing the drying rate of the top coat by reducing the penetration of the top coat into the substrate and enabling the sheet to be made with less of the more costly, slower drying, top coat material.

Formulation of the Base Coat

To accomplish these functions, a base coat formulation is made from a polymer or polymer blend with a Tg (glass transition temperature) from about −5° C. to about +55° C., and preferably about +20° C. The base coat may optionally contain any or all of the following ingredients: pigment, dye, anti-tack additives, adhesion promoters, filler, lubricants, expandable beads or other expandable material, surfactants, dispersants, humectants, and thickeners. This list of additives is not intended to be limiting nor all inclusive. These additives may also be used in the top coat described below.

The formulation is adjusted to optimize its rheology, concentration, and coating characteristics of the particular substrate and coating method chosen. Concentrations of about 15% to about 60% may be selected. Viscosities may range from almost water thin, for spray application, to as much as 60,000 cps, or more, for some reverse roll coaters.

Possible coating methods include but are not limited to, spray, reverse roll, saturation ("dip and nip"), gravure, kiss, and knife coating. Indirect coating methods such as cast coating may also be advantageous for some substrates as it can yield a smooth (or other controlled texture) surface from a substrate which is not smooth. In this case, the coating is deposited on a carrier (usually paper) which has a surface or surface coating which can readily release from the coating being processed. The substrate is laid into the wet or partially dried coating, and drying is completed. The coated substrate is removed from the release surface for use. A chemist skilled in coating technology will be able to adapt the coating composition to the requirements of the substrate and coating method.

A preferred formulation whose concentration and rheology are designed for a floating knife coating technique follows:

| Component | Concentration | Wet Weight | Dry weight |
|---|---|---|---|
| HYCAR 26345 | 50% | 14.03 | 7.01 |
| Water | — | 46.53 | — |
| Ammonium Hydroxide | 28% | 3.13 | — |
| Propylene Glycol | 100% | 1.60 | 1.60 |
| FLEXBOND 825 | 55% | 15.93 | 8.76 |
| RHODASURF ON-800 | 100% | 0.61 | 0.61 |
| ACRYSOL ASE60 | 28% | 3.87 | 1.08 |
| ACRYSOL ASE95 | 18% | 14.30 | 2.57 |
| Total: | | 100.00 | 21.63 |

The Brookfield viscosity of the above formulation is approximately 25,000 cps (spindle 6@20 RPM). The nonvolatile content is approximately 21.6%.

The procedures and techniques needed to effectively mix the above formula are known to a chemist skilled in compounding aqueous coatings.

Ingredients used in Base Coat formulation:
RHODASURF ON-800: Polyethoxylated (20) oleyl alcohol, Mfg. by Rhone-Poulenc Inc., Cranberry, N.J.
FLEXBOND 825: Vinyl acetate-Acrylic copolymer emulsion having a Tg of about +20° C., Mfg. by Air Products and Chemicals Inc. Lehigh Valley, Pa.
ACRYSOL ASE95: Alkali swellable polyAcrylic acid thickener, Mfg. by Rohm and Haas, Co., Philadelphia, Pa.
HYCAR 26345: Elastic acrylic latex polymer having a Tg of about −6° C., Mfg. by B. F. Goodrich
ACRYSOL ASE60: Alkali swellable polyAcrylic acid thickener, Mfg. by Rohm and Haas, Co., Philadelphia, Pa.
RHODASURF, FLEXBOND, ACRYSOL and HYCAR are trademarks.

Coating the Base Coat on the Substrate

Depending upon the substrate, final properties required and coating economics, among other factors, about 0.3 to about 2.5 oz/sq.yd. of dry base coat may be applied to the substrate and dried at a suitable temperature. In the case of the 1.25 oz/sq.yd. wet-laid polyester nonwoven substrate, the preferred application is about 0.7 oz/sq.yd. (dry weight) using a floating knife coater. Alternatively, about 0.5 to 2.5 dry oz/sq.yd. depending on the materials used, but preferably about 2.0 dry oz/sq.yd. of top coat may be applied as a base coat when using a knife over roll coating technique. Base coats which do not contain expandable material may be coated and dried faster and at higher temperatures, than base coats which are expandable. The base coat choice may, in part, reflect the costs and coating rates obtainable with the particular coating line(s) which are available to manufacture the product. Persons skill in coating technology will be able to determine the most economical and effective combination of coatings and coating steps to optimize the performance and cost of product while considering the available coating equipment.

The Expandable Composition

The following is a preferred embodiment of the expandable composition which is water-based. It should be understood that any other solvent-based or latex-based system can also be used, which utilizes mutually compatible components which are also coatable and compatible with a substrate, and expandable in a temperature range which does not damage the substrate.

The preferred expandable composition of the invention includes, (a) an expandable component present in about 15% to 60% dry weight in the dry expandable composition on the substrate; (b) a polymer or other matrix material present in an amount of about 10% to 85% dry weight in the dry expandable composition; and optionally (c) an anti-tack agent at a dry weight content of about 0% to 50%.

Other components of the expandable composition which are primarily used to alter the character of the wet mixture to advance its coatability onto the substrate, include a surfactant, a dispersing agent, an anti-foaming agent, and a thickener system. The thickener system may include a thickener plus an alkali compound for adjusting the viscosity of the thickener.

According to the preferred embodiment of the present invention, the wet composition is applied by knife coating so that the person of ordinary skill in the field of coating, formulation and/or rheology, can select an appropriate thickening system, surfactant, dispersing agent and anti-foaming agent, as well as either an aqueous system as used in the following example, or a system based on a different solvent or on a latex.

The expandable component in the preferred embodiment of the present invention is known by the trademark EXPANCEL 642 made by Eka-Nobel Inc., and comprising expandable microspheres of isobutane, butane, or other low boiling point organic composition, encapsulated in a polymer so that when heated, the encapsulated low boiling point compound expands in balloon-like fashion. EXPANCEL 642 used in a preferred composition of the present invention has an initial unexpanded density of about 1.3 g/cm$^3$, and an expanded density of about 0.2 g/cm$^3$. This is a more accurate measurement of the degree of expansion than, for example, the diameters of the pre and post expanded microspheres which can vary substantially. Just for general scale, the preexpanded microspheres or microbeads, are usually on the order of less than 100 μm in diameter.

The microbeads used in the present invention expand in the range of about 70° C. to 200° C.

The matrix material of the present invention is advantageously HYCAR 26345 made by B. F. Goodrich. This is an elastic acrylic latex polymer having a glass transition temperature, Tg, of about −6° C. Any other polymer or matrix material can be used as long as it has a glass transition temperature, Tg, of about −25° C. to about +25° C. and is sufficiently elastic.

Other examples of a suitable polymer for the present invention are polymers or co-polymers of vinyl acetate, vinyl chloride, various olefins, styrene, butadiene and a variety of other film forming latexes or other compositions. This list is not comprehensive.

The anti-foaming agent of the present invention is known by the trademark FOAMBLAST 187, although other anti-foaming agents known to the person skilled in this field can be utilized.

The anti-tack agent of the present invention is ROYAL QUEEN CLAY, which is an air-floated clay of light color and is used both as an anti-tack agent and filler. The anti-tack agent is used to reduce tackiness of the dry composition, so that the sheet material can be rolled or stacked for storage without sticking. The anti-tack agent also avoids sticking of the substrate to rollers or other equipment in copying machines or in the machine used to puff the expandable composition.

The thickening agent is exemplified by ACRYSOL ASE 60, used in conjunction with ammonium hydroxide (Aqua Ammonia) which makes the ACRYSOL alkaline to increase its viscosity.

The surfactant in the preferred composition is sodium dioctyl sulfosuccinate. This is used in conjunction with the dispersing agent STRODEX PK90, by Dexter Chemical Company, a potassium salt of a phosphoric ester of an alcohol and an aliphatic ethoxylate. The person skilled in this art may select other surfactants.

Water is also used in the wet mixture as a solvent. The following table gives the dry weight of each component in weight percent as it exists in the dry expandable composition on the substrate, as well as the wet content in the wet expandable composition, in weight percent, for each component.

The percent of dry content, dry Cont., is also included to show the amount of dry active material in each of the components which remains after the liquid component has evaporated in the dried substrate.

TABLE

| name | dry weight (wt %) | dry Cont. (wt %) | wet mix (wt %) |
| --- | --- | --- | --- |
| water | 0.00 | 0 | 16.35 |
| sodium dioctyl sulfo succinate solution | 0.69 | 75% | 0.92 |
| STRODEX PK90 | 0.27 | 90% | 0.30 |
| ROYAL QUEEN CLAY | 7.18 | 100% | 7.18 |
| EXPANCEL 642 | 11.37 | 74% | 15.37 |
| FOAMBLAST 187 | 0.21 | 100% | 0.21 |
| HYCAR 26345 | 28.62 | 50% | 57.24 |
| ACRYSOL ASE60 | 0.52 | 28% | 1.87 |
| AQUA AMMONIA | 0.00 | 0 | 0.56 |
| Totals | 48.86% |  | 100% |

When a base coat is used first on a substrate as disclosed above, the expandable composition top coat is preferably applied over the base coat on the substrate using a knife over roll technique, although other coating methods known to those skilled in the art could be utilized.

The Machine

Figure 2:
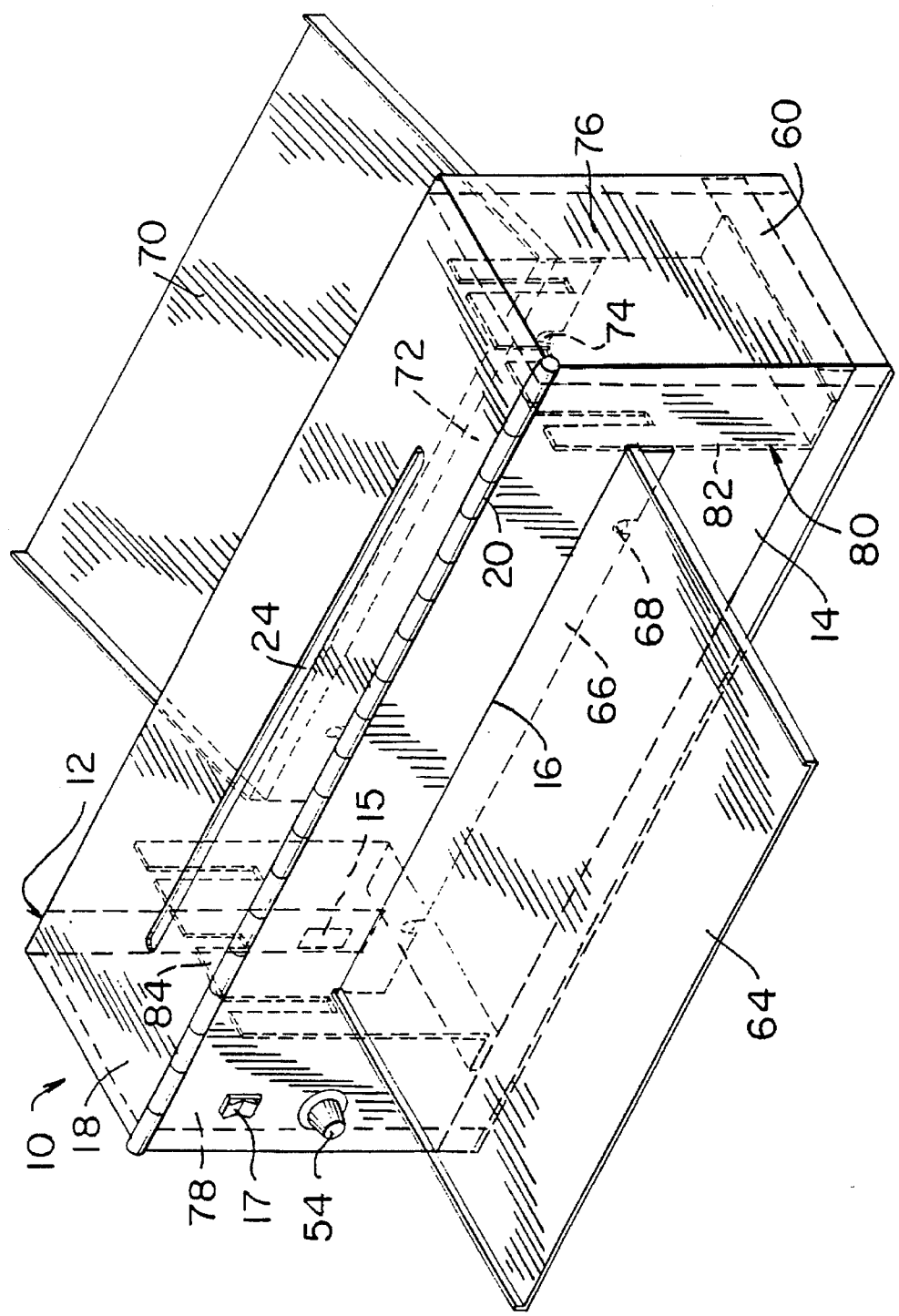
FIG. 2 is a perceptive view with certain elements of the machine superimposed to show their relationship.
Figure 3:
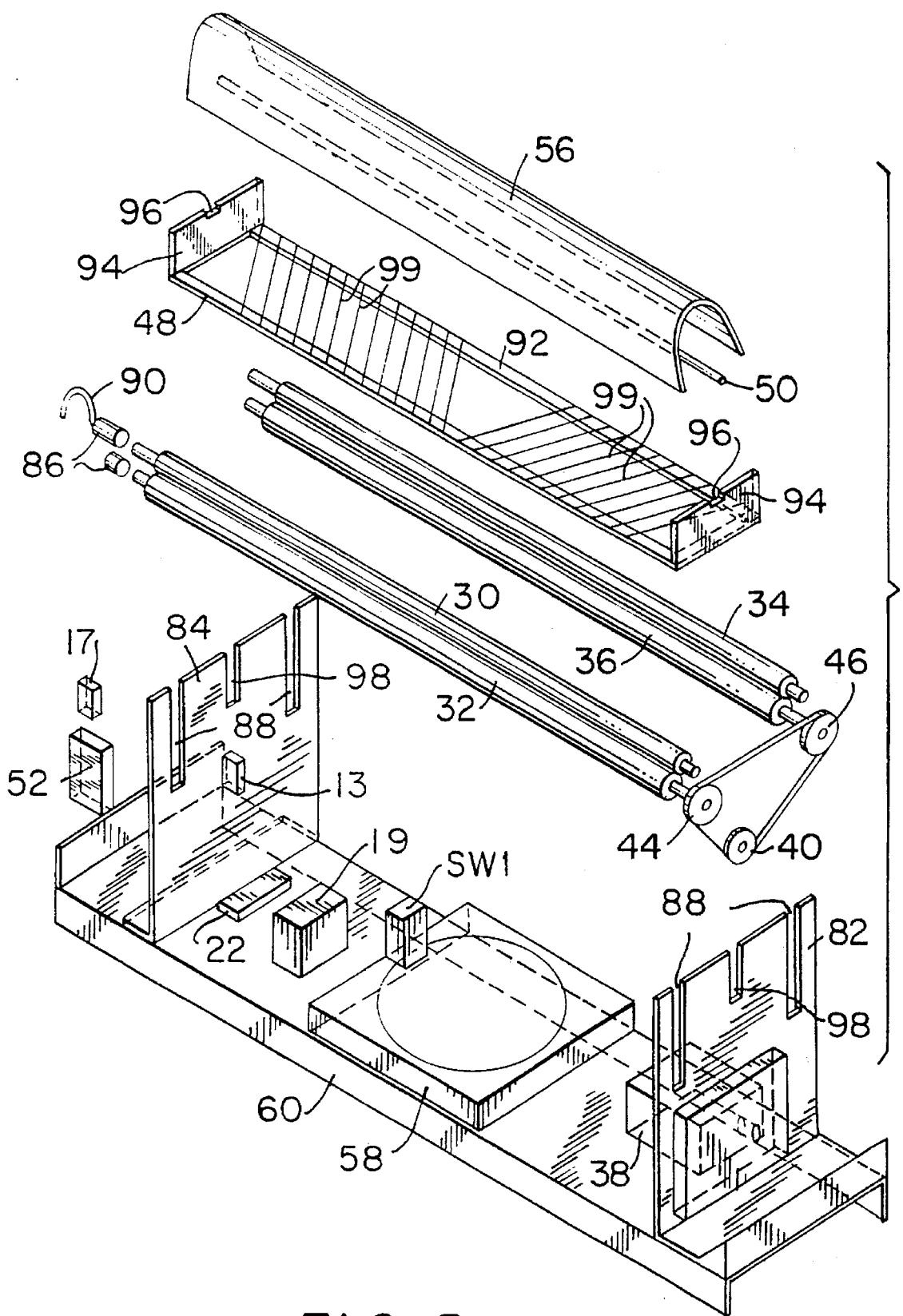
FIG. 3 is an exploded view of other parts of the machine.
Figure 4:
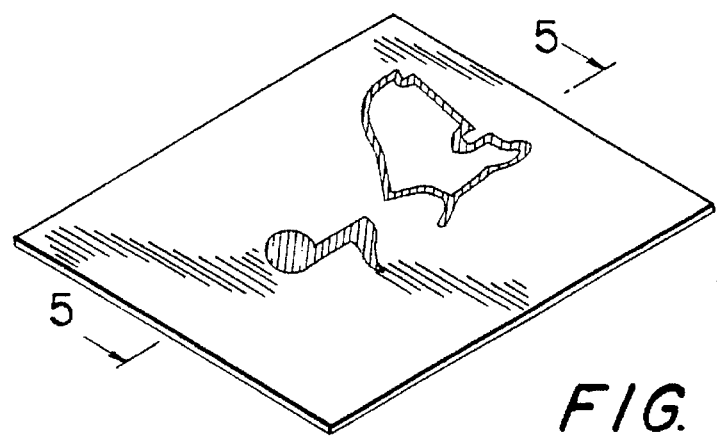
FIG. 4 is a perceptive view of a two dimensional image which can be raised using the present invention.
Figure 5:
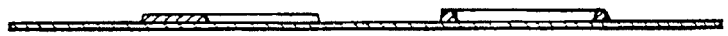
FIG. 5 is a view taken along line 5—5 of FIG. 4, after the image has been raised.

Referring to FIGS. 1-3, the tactile image enhancer machine generally designated 10 in FIG. 1, comprises an enclosure 12 having a rectangular metal front wall 14 with a horizontally extending entrance slot 16. An L-shaped top and rear wall element 18 defines the top and rear walls of the enclosure and is hinged at hinge 20 to the upper edge of front wall 14. For maintenance the entire top and rear of the enclosure can be exposed by lifting wall element 18 in the direction of arrow 22. The top wall portion of element 18 includes a ventilation slot 24. The rear wall portion includes a horizontally extending exit slot 26. A feed path 28 is defined through the enclosure 12 from the entrance slot to the exit slot. A substrate manufactured according to the present invention is fed through the enclosure by introducing the substrate into slot 16 and into the nib formed between entry drive rollers 30 and 32. The substrate is fed along path 28 until it reaches the nib between exit rollers 34 and 36 and thereafter out of the enclosure through exit slot 26. The rollers form part of drive means for moving the substrate through the enclosure, which include a 25 RPM gear motor assembly 38 which rotates a 16 tooth sprocket 40 and, through a drive belt 42 engaged around sprocket 40 and two additional 18 tooth sprockets 44 and 46, rotate lower rollers 32 and 36 in a clockwise direction as viewed in FIG. 1.

The lower drive rollers 32, 36, have steel cores with 15 inches of rubber covering them. The OD of the rubber rollers 32, 36 is ¾ of an inch and the rollers are suspended in self-lubricating bushings. The upper set of idle rollers 30 and 34 are spring loaded against the drive rollers. The upper rollers have a ⅝ inch OD and are made of aluminum and are also suspended in self-lubricating bushings. Spring tension is created by looping an expansion spring over the bushings of the upper rollers and pushing the springs down toward the respective drive rollers. This will be explained in connection with FIG. 3.

Between the entry and exit sets of rollers, a transport grid 48 is provided immediately under the feed path 28 for supporting the substrate as it moves along the path. Above the transport grid 48, a radiant source such as a heat lamp in the form of a 1,000 watt quartz iodine infrared lamp 50 is provided. Lamp 50 is 15 inches long and is driven by a Triac control circuit 52 which is controllable by a knob 54 to adjust the intensity of the lamp. A 1/16th inch thick aluminum reflector 56 which is 2 inches wide and circular, is mounted above lamp 50 to reflect the infrared heat downwardly, toward the feed path 28.

A cooling fan 58 is mounted in the bottom of the enclosure on a platform 60 having a large circular vent hole 62 therein for ventilating the enclosure. To support the substrate as it is supplied to and withdrawn from the enclosure 12, a feed tray 64 having a flange 66 mounted on a pair of pins 68 is positioned just under the entrance slot 16, and an exit tray 70 with a flange 72 mounted on a pair of pins 74, is mounted just under the exit slot 26.

Referring to FIG. 2, enclosure 12 includes side walls 76 and 78 to which the front wall 14 is fastened, for example by screws. The side walls and front wall 14 are also fastened to the platform or base 60, by screws connected to vertically extending flanges of the base.

The rear wall of the wall element 18 is also fastened by removable screws to the side walls 76, 78, for removal to allow element 18 to pivot on hinge 20 for access to the interior of the enclosure, for example to remove a misfed sheet, or replace parts of the machine.

FIG. 2 also illustrates an internal frame generally designated 80 which comprises two L-shaped upright elements 82 and 84 that each contain two long vertical slots and one short vertical slot, for mounting the rollers, the transport grid, the lamp and the reflector, as well as other internal parts of the enclosure.

Trays 64 and 70 are easily removable by simply lifting them off their respective pins 68, 74, for easier transport and storage of the machine.

It is noted that several of the internal parts of the machine are missing from FIG. 2 for clarity.

FIG. 3 shows the internal parts in an exploded orientation.

Two of the eight self-lubricating bushings 86 which engage around the roller shafts, are illustrated. The bushings are designed to slide within vertical bushing slots 88 in the frame elements 82, 84. One of the four springs 90 is also illustrated which are designed for insertion into the top of the slots 88 to spring load the upper idle rollers 30 and 34.

Transport grid 48 comprises a central open frame 92 and opposite ends 94 having notches 96 for use in conjunction with vertical slots 98 in the frame elements 82, 84, for supporting the grid 48, lamp 50 and reflector 56. The aluminum frame 92, 94, carries stainless steel wire guides 99 which are stretched across the frame 92 to form a V, with the vertex being centered on the entry slot 16. This insures that the substrate or substrate will be transported along the feed path 28, across the grid, without catching on the wires. Fan 58 is mounted on the base 60 and has a two-fold purpose. It keeps the enclosure and machine cool and also creates a downward vacuum which assist in holding the substrate down on the transport grid.

Figure 6:
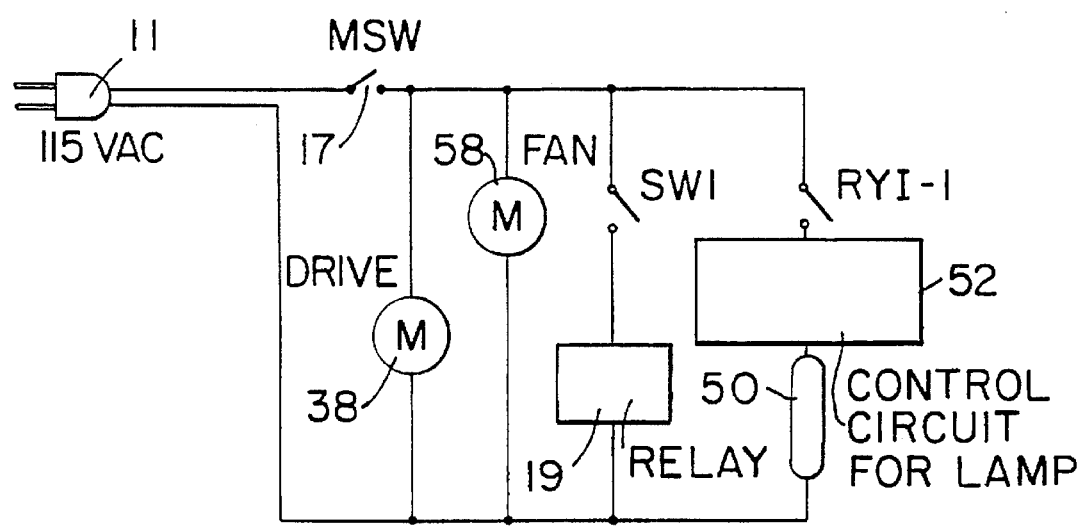
FIG. 6 is a schematic circuit diagram of the electronic components of the machine.

FIG. 6 illustrates the simple circuitry of the invention. The machine is plugged into a 115 volt AC source using a standard plug 11 which, referring to FIG. 3, is inserted into a power receptacle 13 advantageously positioned behind an aperture 15 in the rear wall portion (see FIG. 2) so that the plug 11 must be removed before the wall element 18 can be pivoted, thus assuring that there is no power supply to the machine when the enclosure is open.

Returning to FIG. 6, a main switch 17 is closed to supply power to the drive motor forming part of the gear drive 38, and to the fan motor forming part of the ventilation fan 58. An internal switch SW1, is connected between the power line and a relay 19 having a relay switch RYI-1 used as an overload protection for powering the control circuit 52 which is adjustable for changing the intensity of the lamp 50. A barrier strip 22 is also provided on base 60.

Reference numeral 50 also schematically identifies an alternate radiant energy source such as an RF or microwave source which can be used to irradiate and thus heat the substrate and raise the darkened tactile image.

Figure 7:
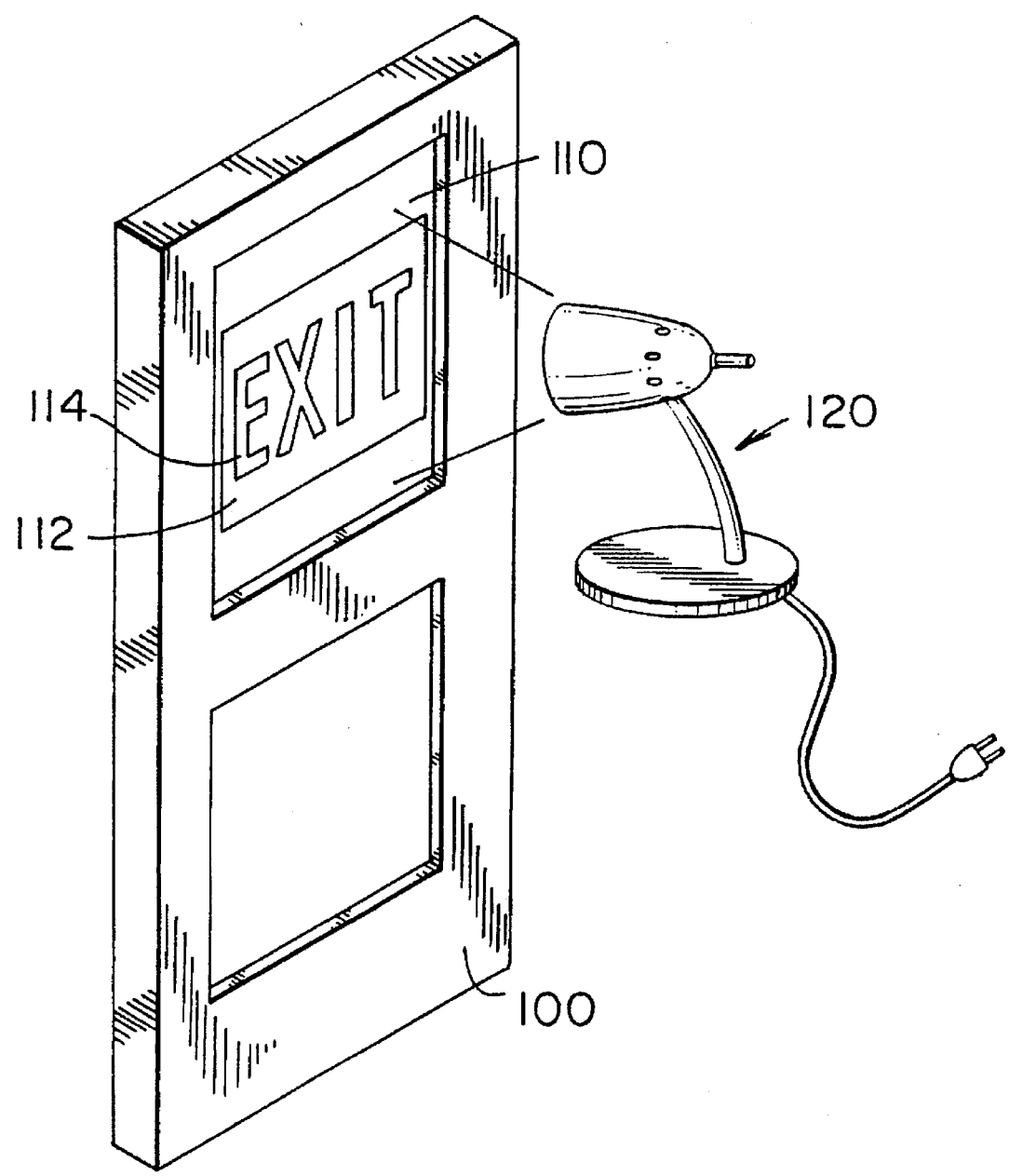
FIG. 7 is a perspective view of the invention used on an object.

Referring to FIG. 7, an example of use of the invention is illustrated. The invention can be applied to any object, whether flat or three-dimensional, such as a door 100, which is given by way of example only. The object may have a surface, such as an upper panel 110, which is either directly coated with the expandable composition of the invention, or to which a substrate 112, coated with the expandable composition is adhered. An image which is darker than the remainder of the substrate, such as the pattern of letters spelling "EXIT" are applied (using any process) to the surface of the coated substrate 112 or the expandable coating on the object 100. This is shown at 114. Using any portable source of heat or irradiation such as a simple heating lamp generally designated 120, the substrate 112 is heated, with the darker image 114 being heated to a higher temperature because of its higher absorption characteristic, than the remainder of the substrate 112; thus expanding or puffing the image. In the example of FIG. 7, a tactile image which can be read by a visually handicapped person is thus cheaply and easily applied to an exit doorway.

The present invention is meant to include the application of the expandable composition and use of the inventive technique to the surface of any structure where a tactile image may be useful. The structure may be three-dimensional or flat and the surface may be two-dimensional or three-dimensional shape.

While specific embodiments of the invention have been shown and described in detail to illustrate the application of the principles of the invention, it will be understood that the invention may be embodied otherwise without departing from such principles.

What is claimed is:

1. A sheet material for use in making a raised image, so that it can be perceived by a visually handicapped individual using the tactile sense, comprising:

a substrate having a color which absorbs radiated energy to a first, low extent, the substrate being impervious to heat within a selected elevated temperature range, the substrate being nonwoven and made at least one of polyester, polypropylene, polyolefin and polyamide and at least some cellulose;

a coating of dry expandable composition coated over substantially all of the area of the substrate, the expandable material being expandable when exposed to the elevated temperature range, the expandable composition containing an expandable component comprising expandable microspheres, and a matrix material for containing the microspheres and forming a raised film when the microspheres expand; and an image which is of interest to a visually handicapped individual, applied to the substrate, the image having a dark, dense color which absorbs radiated energy to a second, high extent which is greater then the first, low extent, so that when the substrate is exposed to radiated energy for reaching the elevated temperature range, the expandable microspheres expand only in the two dimensional image to raise the two dimensional image, and not elsewhere on the substrate, so that the image can be perceived by the visually handicapped individual using the tactile sense.

2. A sheet material according to claim 1, wherein the expandable component in the dry coating on a substrate, represents from about 15% to about 85% by weight of the expandable composition.

3. A sheet material according to claim 1, wherein the matrix material is a polymer and includes an anti-tack component in the expandable composition comprising from 0 to 50% by weight of the dry expandable composition of the substrate.

4. A sheet material according to claim 1, wherein the matrix material and microspheres are selected to respectively accommodate expansion and expand, at an elevated temperature range of about 35° to about 200° C.

5. A sheet material according to claim 1, wherein the substrate is nonwoven and has a weight of about 0.5 to 6 oz/sq.yd.

6. A sheet material according to claim 1, including a base coat layer between the substrate and the coating of dry expandable composition, the base coat layer being made from a polymer or polymer blend with a Tg of from about −5° C. to about +55° C.

7. A sheet material according to claim 6, wherein the base coat has a dry weight of about 0.3 to about 2.5 oz/sq.yd.

* * * * *